United States Patent Office 3,373,284
Patented Mar. 12, 1968

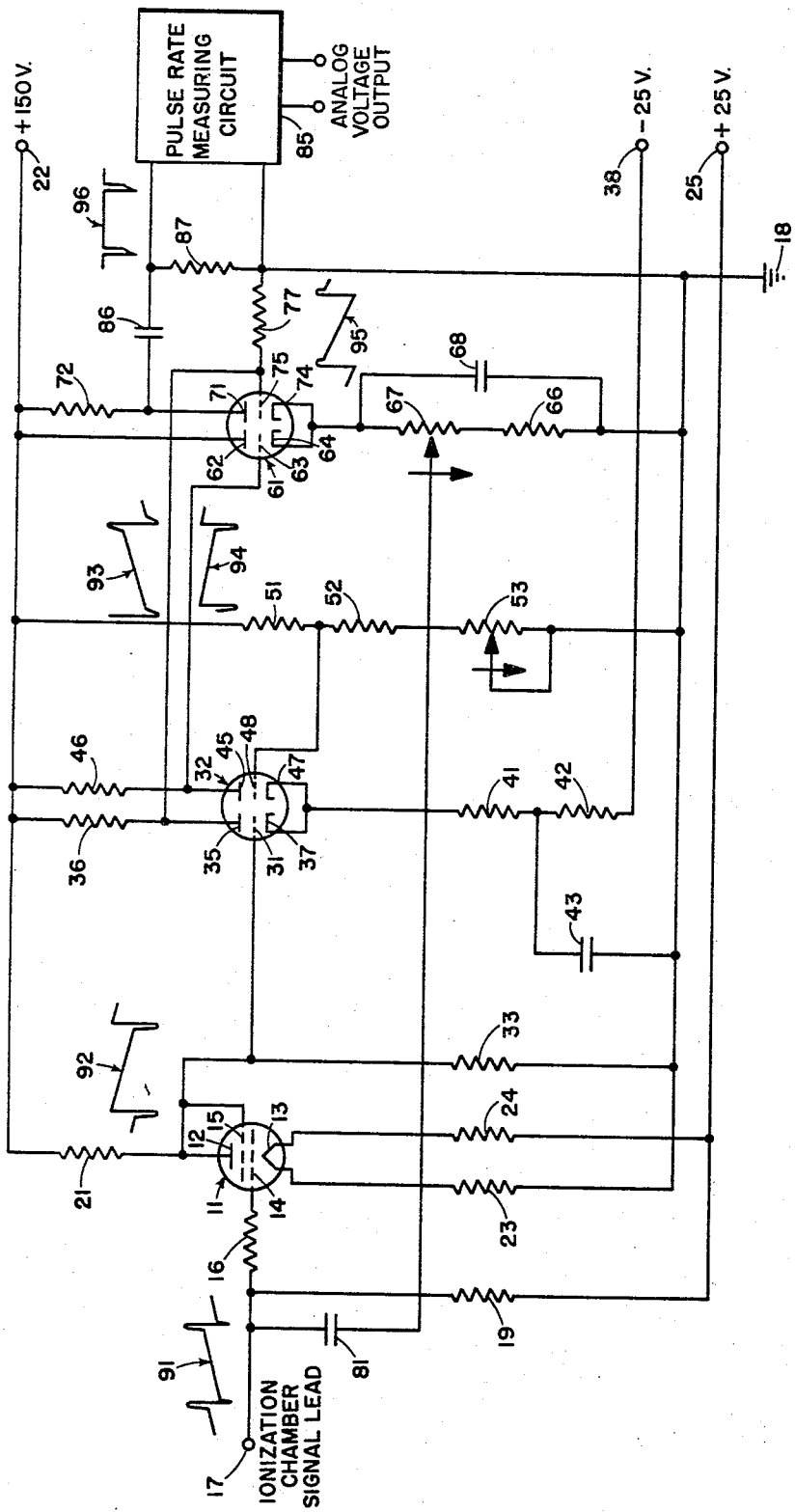

3,373,284
CURRENT MEASURING APPARATUS FOR USE
WITH AN IONIZATION CHAMBER
Herbert A. Brown, San Pablo, and Donald G. Hutson,
Albany, Calif., assignors to Laboratory for Electronics,
Inc., Boston, Mass., a corporation of Delaware
Filed June 14, 1965, Ser. No. 463,500
7 Claims. (Cl. 250—83.6)

ABSTRACT OF THE DISCLOSURE

This invention contemplates the use of an integrating circuit coupled to an ionization chamber for developing a voltage which is a function of the amplitude of the current from the ionization chamber. A trigger circuit is coupled to the integrating circuit to produce a pulse signal when the developed voltage reaches a predetermined threshold value. Upon the occurrence of such a pulse, reset means are provided to dissipate the voltage thereby enabling the trigger circuit to produce a train of pulses at a rate commensurate with the rate at which the voltage is developed. Finally, a pulse rate measuring circuit is used to derive an analog signal which is a logarithmic function of the pulse rate.

---

This invention relates generally to current measuring devices and more particularly it is concerned with the measurement of the output current of an ionization chamber.

As is well known to those skilled in the art an ionization chamber is a device for producing an electrical current in response to ionizing radiation. The amount of current produced depends upon the intensity of the radiation and for area monitoring applications, by way of example, the range of currents required to be measured is usually from about $10^{-13}$ to $10^{-7}$ amperes. To measure such small currents accurately is naturally a problem. Moreover, the problem is aggravated by the fact that it is usually preferred not to have to use range switching techniques in making the measurements over the 6 decades covered by this range.

In the past the type of current measuring instrument which has been applied to this type of current measuring requirement most frequently is the so-called logarithmic electrometer. In essence, this instrument consists of an operational amplifier which is adapted to provide an approximate logarithmic response through the use of a negative feedback circuit incorporating a logarithmic diode. Alternatively, an approximation of a logarithmic response characteristic may be obtained by appropriate design of the input stage of the amplifier. Neither of these approaches has proved entirely satisfactory primarily because of inherent amplifier instability. Typical of the amount of drift that has been encountered is ⅓ of 1 decade per day. Also, the fact that the instrument does not exhibit an exact logarithmic response is another disadvantage.

To avoid these disadvantages the present invention contemplates an instrument in which the current output of the ionization chamber is converted to a pulse rate which is in turn reconverted to an analog signal having the desired logarithmic response characteristic. That is to say, in the instrument according to the present invention there is provided an integrating circuit to develop a voltage at a rate determined by the amplitude of the current to be measured, together with pulse generating circuitry which is enabled to produce a pulse and reset the integrating circuit whenever the voltage reaches a predetermined threshold level. In this way, a train of pulses is produced whose repetition rate is commensurate with the rate at which the voltage is developed. Conventional pulse integrating circuitry is then employed to develop a final voltage output signal whose amplitude is a logarithmic function of the pulse repetition rate.

It is the primary object of the invention, therefore, to provide an improved form of current measuring instrument designed especially for use with an ionization chamber.

A more specific object is to provide an instrument of the above-mentioned character which has a logarithmic response characteristic and is appreciably more stable than conventional instruments of a similar character.

The novel features of the invention together with further objects and advantages will become more readily apparent from the following detailed description and the drawing to which the description refers.

In the drawing the instrument of the present invention is illustrated in block-schematic form.

With reference now to the drawing it will be observed that the numeral 11 designates a tetrode electron tube having an anode 12, a filament 13, a control grid 14, and a screen grid 15. Control grid 14 is connected through a resistor 16 to an input terminal 17 by way of which the current to be measured is supplied to the apparatus of the present invention. There is also a common or ground terminal 18 and connected between these two terminals is a high megohm shunt resistor 19. The anode 12 of tetrode 11 is connected through an anode resistor 21 to a source of anode potential by way of a terminal 22 and the screen grid 15 is coupled directly to the anode. One side of filament 13 is connected through a biasing resistor 23 to ground while the other side of the filament is connected through another biasing resistor 24 to a source of biasing potential at a terminal 25. This circuit configuration of the tetrode 11, as implemented by the illustrative values of the circuit elements specified hereafter, will be recognized by those skilled in the art as an electrometer tube configuration.

The output of the tetrode which is derived from its anode 12 is resistively coupled to one of the control grids 31 of a dual triode 32. Resistive coupling is afforded by a resistor 33 which is connected between anode 12 and ground. Dual triode 32 is adapted to serve as a phase splitter and to this end it has an anode 35 connected to anode terminal 22 through a resistor 36 and a cathode 37 which is connected through a series combination of resistors 41 and 42 to a second source of biasing potential represented by a terminal 38. A by-pass capacitor 43 is connected from the common junction of resistors 41 and 42 to ground. Thus far it is the circuit connections associated with the electrodes of one-half of the dual triode 32, namely the left hand half as it appears in the drawing, that have been described.

Now as regards the right hand half of the dual triode 32, anode 45 is connected to the source of anode potential through anode resistor 46 and cathode 47 is tied to cathode 37. The control grid 48 associated with anode 45 and cathode 47 is connected to a fixed potential which appears at the junction of a pair of resistors 51 and 52. Resistors 51 and 52 are seen to form a voltage divider by virtue of their series connection between terminal 22 and ground. For more precise adjustment of the potential appearing at the junction of these resistors, there is also provided an adjustable resistance 53 between resistor 52 and ground.

The phase opposed outputs which are present at the two anodes of dual triode 32 are applied to a monostable device formed with a dual triode 61. One half of the dual triode, that is the left hand half as it appears in the drawing, is comprised of an anode 62, control grid 63 and a cathode 64. Control grid 63 is connected directly to the anode 45 of dual triode 32, anode 62 is connected directly to the terminal 22, and cathode 64 is connected to ground through the series combination of a resistor 66 and the winding ends of a potentiometer 67. There is also a bypass capacitor 68 between cathode 64 and ground. The other half of dual triode 61, that is the right hand half, has its anode 71 connected through an anode resistor 72 to the terminal 22 and its cathode 74 tied to cathode 64. The grid 75 of this triode half is connected directly to the anode 35 of dual triode 32. Also grid 75 is effectively connected to ground through a coupling resistor 77.

Finally there is provided a feedback path which is disposed between the cathode circuit of dual triode 61 and the grid circuit of tetrode 11. This feedback path or circuit is formed with an integrating capacitor 81, one side of which is connected to input terminal 17 and the other side of which is connected to the movable arm of potentiometer 67. The pulse output which is generated by the circuitry described thus far is applied to a pulse rate measuring circuit 85 by means of a coupling capacitor 86 and resistor 87. One side of capacitor 86 is connected to anode 71 and the other side is connected to the ungrounded input of the pulse measuring circuit. Resistor 87 is connected between the ungrounded and grounded input terminals of the pulse rate measuring circuit which has not been shown in detail inasmuch as the type of circuit contemplated for use in connection with the apparatus of the present invention is well known to those skilled in the art. A complete description of this type of circuit is to be found in Patent No. 2,715,712 issued on Aug. 16, 1955 to E. W. Pulsford. Accordingly, the following is concerned primarily with the mode of operation of the circuitry shown schematically in the drawing.

In operation, current from the ionization chamber serves to charge capacitor 81 and as charge builds up on this capacitor, there is produced a linear voltage increase or ramp at the input of the apparatus. This is illustrated by the waveform 91 located directly above the lead between terminal 17 and resistor 16. By means of tetrode 11, the voltage waveform is amplified and in the process undergoes a phase reversal as shown by waveform 92. The left half of the dual triode 32 which is coupled to the anode of tetrode 11 is adapted to produce still another phase reversal so that as a result, the voltage appearing at its output is of the same phase as that presented to the grid circuit of tetrode 11. The opposite is true of the right hand half of triode 32 by virtue of its grid potential being fixed and its cathode potential being dependent upon the current in the left hand half of the triode. This is shown by waveforms 93 and 94 in the drawing which are applied to the respective inputs or grid circuits of dual triode 61.

At this stage of the operation, the right half of triode 61 is cut off. Accordingly, as the voltage at terminal 17 and hence grid 14 increases, the current decreases in the left half of triode 61 resulting in a corresponding decrease in the potential at potentiometer 67. Since potentiometer 67 is connected to capacitor 81, the effect on the input voltage waveform is seen to be degenerative. That is to say, the voltage appearing at potentiometer 67 is fed back in a negative sense to the control grid of tetrode 11 and the effect is equivalent to increasing the dynamic capacitance of capacitor 81 by a factor equal to the gain of the circuit. This minimizes the problem of stray leakage which makes for a more linear voltage-current relation.

As soon as the voltage at terminal 17 reaches a predetermined threshold value, the right half of triode 61 begins to conduct causing the voltage at terminal 17 to increase instead of decreasing as was the case with the left half of the triode. In other words, the right half of triode 61 has a regenerative effect on the input to the tetrode which results in a rapid build up of current through potentiometer 67 and a rapid increase in the voltage at terminal 17 to a value which greatly exceeds the aforementioned threshold value. This is reflected in cathode waveform 95 and the input circuit waveform 91. By means of capacitor 86 and resistor 87, waveform 95 is in effect differentiated, yielding an output pulse as shown by the waveform 96. It will also be noted from waveform 95 that under these conditions the grid potential of the left half of triode 61 undergoes a rapid decrease causing this half of the triode to become cut off until the circuit resets itself.

The reset action of the circuit revolves around the operation of tetrode 11 when its grid voltage is rapidly increased by the regenerative effect of conduction by the right half of triode 61. Under these circumstances, grid current is caused to flow in the tetrode 11 so that its grid-filament circuit serves as a discharge path for the capacitor 81. With capacitor 81 discharged, the voltage at terminal 17 reverts to the value it had at the beginning of the ramp (waveform 91) thereby switching the left half of triode 61 back on and the right half off. Thus begins the generation of a new ramp at a rate determined by the input current value and ultimately a retriggering of triode 61 at a commensurate rate. In other words, a train of pulses is produced, as shown by waveform 96, whose repetition rate is a substantially linear function of the input current value to be determined. By means of pulse rate measuring circuit 85, this pulse rate is finally converted to an analog voltage which can be readily indicated, as by a meter. The most significant part of this conversion process is, of course, that the pulse rate-analog voltage relation is a precise logarithmic one which is the type of response most often required in the light of the relatively wide range of currents to be measured.

Typical types and values for the components shown in the diagram are, by way of example, as follows:

Tubes:
| | |
|---|---|
| 11 | 5886 |
| 32 | 6021 |
| 61 | 6021 |

Capacitors:
| | | |
|---|---|---|
| 43 | mfd | .01 |
| 68 | mfd | .0033 |
| 81 | pfd | 100 |
| 86 | mfd | .1 |

Resistors:
| | |
|---|---|
| 16 | 100K |
| 19 | 60,000M |
| 21 | 3.3M |
| 23 | 220 |
| 24 | 2.2K |
| 33 | 470K |
| 36 | 47K |
| 41 | 12K |
| 42 | 560 |
| 46 | 47K |
| 51 | 330K |
| 52 | 10K |
| 53 | 20K |
| 66 | 68K |
| 67 | 30K |
| 72 | 2.2K |
| 77 | 270K |
| 87 | 100K |

Although the invention has been described in terms of a single preferred embodiment those skilled in the art will recognize that various alternatives and modifications that are within the spirit and scope of the invention are possible. One possibility is a different form of electrometer circuit using a semiconductor. In fact, the overall circuit configuration is susceptible to implementation with semiconductor devices. Therefore, the invention should not be deemed to be limited to the details of what has been described herein by way of illustration, but rather it should be deemed to be limited only by the scope of the appended claims.

What is claimed is:

1. Current measuring apparatus designed for use with an ionization chamber, said apparatus comprising an integrating circuit coupled to said ionization chamber to develop a voltage at a rate which is a function of the amplitude of the current from the ionization chamber, a trigger circuit coupled to said integrating circuit to produce a pulse signal when said voltage reaches a predetermined threshold value, reset circuit means coupled between said trigger circuit and said integrating circuit to dissipate said voltage upon the occurrence of said pulse signal whereby said integrating circuit is reconditioned to develop said threshold voltage and said trigger circuit to reproduce said pulse signal at a rate commensurate with the rate at which said voltage is developed, and means to derive an analogue signal which is a logarithmic function of the repetition rate of said pulse signals.

2. Apparatus as claimed in claim 1 wherein said integrating circuit includes an amplifier having negative feedback means to decrease the rate at which said voltage is developed.

3. Apparatus as claimed in claim 2 wherein said trigger circuit includes positive feedback means coupled to said integrating circuit to substantially increase the level of the voltage developed thereby beyond said threshold value.

4. Apparatus as claimed in claim 3 wherein said integrating circuit includes a storage capacitor, and said reset circuit means includes a unidirectionally conductive device connected to said capacitor to discharge the same when the level of the voltage developed by said integrating circuit is increased substantially beyond said threshold value.

5. Apparatus as claimed in claim 4 wherein said amplifier includes an electrometer tube having input and output circuits, and said unidirectionally conducted device is formed by the input circuit of said electrometer tube.

6. Apparatus as claimed in claim 5 wherein said trigger circuit includes a monostable device having a pair of input circuits and a common output circuit, said positive and negative feedback means comprises a conductive path between said common circuit and said capacitor.

7. Apparatus as claimed in claim 6 wherein said amplifier includes a phase splitter having an input circuit and a pair of output circuits, said input circuit being connected to the output circuit of said electrometer tube and said output circuits being connected respectively to the input circuit of monostable device.

References Cited
UNITED STATES PATENTS 3,160,754  12/1964  Elliott et al. _____ 250—83.6

ARCHIE R. BORCHELT, *Primary Examiner.*